United States Patent [19]

Ideta et al.

[11] 4,227,602

[45] Oct. 14, 1980

[54] HYDRAULIC POWER CLUTCH CONTROL SYSTEM HAVING AN INCHING VALVE

[75] Inventors: Yasufumi Ideta; Shoei Watanabe, both of Koganei, Japan

[73] Assignee: Nissan Motor Company, Limited, Yokohama, Japan

[21] Appl. No.: 864,147

[22] Filed: Dec. 23, 1977

[30] Foreign Application Priority Data

Dec. 27, 1976 [JP] Japan .............................. 51/156543

[51] Int. Cl.² .......................................... F16D 11/00
[52] U.S. Cl. ................................................ 192/109 F
[58] Field of Search .............. 192/109 F, 12 A, 17 A, 192/13 R, 12 C, 4 A

[56] References Cited

U.S. PATENT DOCUMENTS

| | | | |
|---|---|---|---|
| 3,365,035 | 1/1968 | Kress | 192/109 F |
| 3,469,472 | 9/1969 | Bislew | 192/109 F |
| 3,656,600 | 4/1972 | Kitano et al. | 192/109 F |
| 3,746,135 | 7/1973 | Ishikawa | 192/4 A |
| 3,757,915 | 9/1973 | Momose | 192/4 A |
| 3,946,760 | 3/1976 | Murakami et al. | 192/109 F |

*Primary Examiner*—Peter M. Caun
*Attorney, Agent, or Firm*—Schwartz, Jeffery, Schwaab, Mack, Blumenthal & Koch

[57] ABSTRACT

The spool of the inching valve has first and second lands, a first portion connected to the first land and tapered or suitably formed in such a manner as to gradually increase the flow resistance of the inlet port in accordance with the axial movement of the spool into a position in which the first land fully closes the inlet port, and a second portion connected to the second land and having a reduced uniform diameter or a suitable form which initially temporarily abruptly reduces the flow resistance of the drain port and subsequently gradually reduces the flow resistance thereof in accordance with the axial movement of the spool from a position in which the second land opens the drain port.

8 Claims, 9 Drawing Figures

HYDRAULIC POWER CLUTCH CONTROL SYSTEM HAVING AN INCHING VALVE

BACKGROUND OF THE INVENTION

1. Field of the Invention

The present invention relates generally to an improvement in a hydraulic control system for a transmission which is employed in industrial vehicles such as, for example, fork lifts and shovel loaders and which is equipped with a hydraulically operated clutch of a wet type and particularly to an improvement in an inching valve forming a part of the hydraulic control system.

2. Description of the Prior Art

As is well known in the art, in a hydraulic control system of this type a selector valve is fed with a hydraulic fluid pressure which is produced by a pump and is regulated by a pressure regulator valve. The regulated hydraulic fluid pressure is fed from the selector valve operated by the driver through a selector lever to a hydraulic fluid chamber of a selected section of the clutch connected to a torque converter to perform forward or reverse travel or a halt of the vehicle.

Furthermore, an inching valve interlocked with the brake pedal of the vehicle is arranged between the pressure regulator valve and the selector valve. The inching valve serves, when the brake pedal is depressed, to reduce the hydraulic fluid pressure fed to the clutch to automatically disengage it before the brakes are acting even if the selector valve is in a position for the forward or reverse travel of the vehicle. The inching valve serves, when the brake pedal is released, to engage the clutch.

An inching valve of a conventional hydraulic control system has had a structure which causes the hydraulic fluid pressure fed to the clutch to be abruptly varied at a stage of and with respect to the displacement of the inching valve. As a result, since range of the displacement of the inching valve in which the clutch is incompletely engaged is very narrow, it has been difficult or impossible to gently or slowly engage the clutch to effect an inching operation of the vehicle.

SUMMARY OF THE INVENTION

It is, therefore, an object of the invention to provide a hydraulic control system comprising an improved inching valve having a structure which causes the hydraulic fluid pressure fed to the clutch to be slowly varied at a stage of and with respect to the displacement of the inching valve thereby to widen the range of the displacement of the inching valve in which the clutch is incompletely engaged and to slowly engage the clutch to effect an inching operation of the vehicle.

This object is accomplished by tapering off a first portion from a first land of the spool of the inching valve to cause the first portion to gradually reduce the cross sectional area of the inlet port until the first land fully closes same and by connecting a second portion to a second land to form a step at an end thereof to cause the second portion to abruptly increase the cross sectional area of the drain port immediately after the second land opens same.

BRIEF DESCRIPTION OF THE DRAWINGS

This and other features and advantages of the invention will become more apparent from the following detailed description taken in connection with the accompanying drawings in which.

DETAILED DESCRIPTION OF PREFERRED EMBODIMENTS

Figure 1:
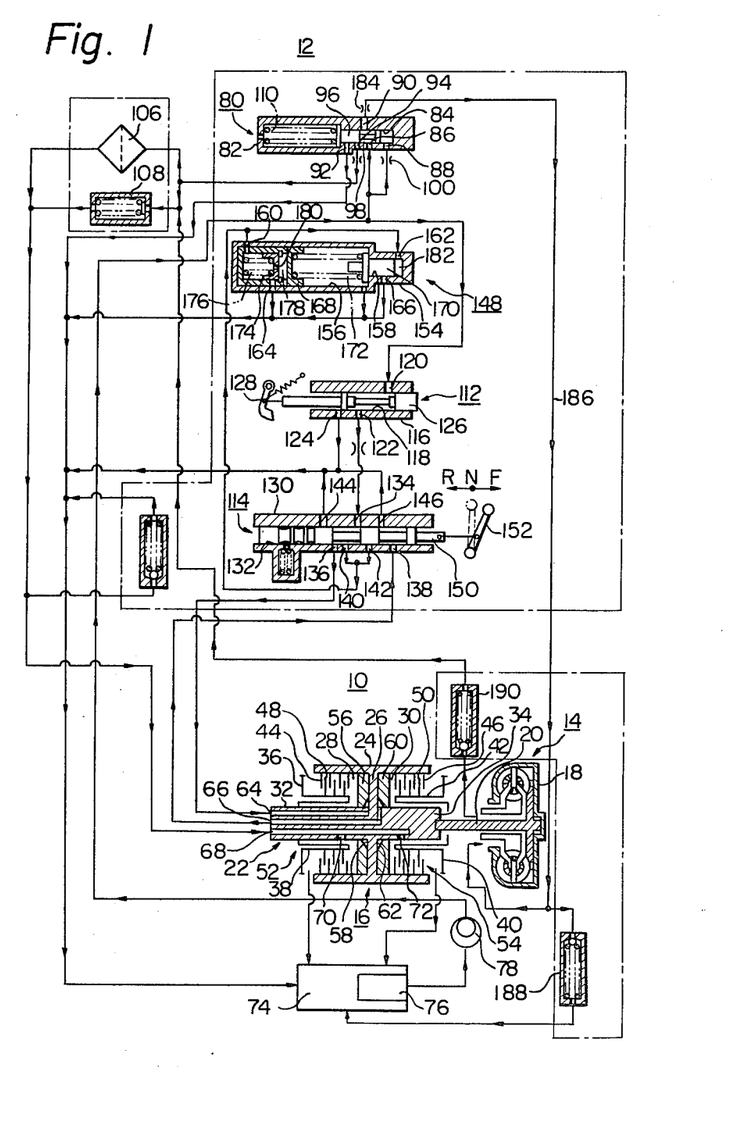
FIG. 1 is a schematic cross sectional view of a preferred embodiment of a combination of a transmission and a hydraulic control system comprising an inching valve according to the invention.

Referring to FIG. 1 of the drawings, there is shown a transmission 10 for a motor vehicle (not shown), and a hydraulic control system 12 for controlling the transmission or gear box 10. The hydraulic control system 12 is provided with a shut-off valve or an inching valve according to the invention. The transmission 10 is exemplified to provide one forward speed and one reverse speed.

The transmission 10 includes a hydraulic torque converter 14 and a hydraulic power clutch assembly 16. The torque converter 14 includes a pump impeller (no numeral) fixedly connected to an output shaft (not shown) of an engine (not shown) of the vehicle, a turbine impeller (no numeral) and an output shaft 20 fixedly connected thereto. The output of the engine is transmitted to the output shaft 20 by driving the turbine impeller after the torque of the output is converted.

The clutch assembly 16 includes a clutch input shaft 22 concentrically splined to the output shaft 20 of the torque converter 14 in such a manner as to be rotated integrally with the output shaft 20. A clutch drum 24 is concentrically and fixedly secured to the input shaft 22. A partition 26 is provided to axially divide the interior of the clutch drum 24 into first and second drum chambers 28 and 30 and concurrently the input shaft 22 into first and second sections 32 and 34. A driving gear wheel 36 for forward travel is fixedly mounted on a suitable carrier 38 such as, for example, a hollow shaft which is arranged around the first section 32 of the input shaft 22 rotatably with respect to the input shaft 22. A driving gear wheel 40 for reverse travel is fixedly mounted on a suitable carrier 42 such as, for example, a hollow shaft which is arranged around the second section 34 of the input shaft 22 rotatably with respect to the input shaft 22. Drive plates 44 are splined to an internal wall surface of the drum chamber 28. Drive plates 46 are splined to an internal wall surface of the drum chamber 30. Driven plates 48 are splined to an external wall surface of the carrier 38, while driven plates 50 are splined to an external wall surface of the carrier 42. Each drive plate 44 and each driven plate 48 are alternately arranged so that the drive plates 44 form a forward clutch 52 in cooperation with the driven plates 48. Each drive plate 46 and each driven plate 50 are alternately arranged so that the drive plates 46 form a reverse clutch 54 in cooperation with the driven plates 50. A piston 56 is slidably fitted in the drum chamber 28 between the partition 26 and the forward clutch 52. A fluid chamber 58 is defined between the partition 26 and the piston 56. A piston 60 is slidably fitted in the drum chamber 30 between the partition 26 and the reverse clutch 54. A fluid chamber 62 is defined between the partition 26 and the piston 60. Each of the pistons 56 and 60 is urged toward the partition 26 by a return spring (not shown). The input shaft 22 is formed therein with passages 64 and 66 communicating respectively with the fluid chambers 58 and 62. The input shaft 22 is further formed therein with a passage 68, and ports or passages 70 and 72 branching off from the passage 68 and opening respectively into the clutches 52 and 54.

The clutches 52 and 54 communicate with a hydraulic fluid tank or sump 74 for return of lubricating hydraulic fluid. A hydraulic fluid pump 78 communicates with the sump 74 through a filter 76. The pump 78 is driven to draw hydraulic fluid from the tank 74 and produces a hydraulic fluid pressure.

A pressure regulating valve 80 is provided which regulates the hydraulic fluid pressure produced by the pump 78 to a control or line pressure which has a predetermined value and is employed for operating the turbine impeller of the torque converter 14 and for engaging the clutches 52 and 54. The pressure regulating valve 80 comprises a valve body or housing 82 formed with a bore 84, inlet ports 86 and 88, an outlet port 90 and drain ports 92 and 94. A spool or slidable valve element 96 is slidably fitted in the bore 84 and is formed with an annular groove 98. The inlet port 86 communicates with the pump 78 to receive the line pressure and with the outlet port 90 through the annular groove 98. The inlet port 88 communicates with the pump 78 through a restriction or orifice 100 to receive the line pressure and with the bore 84 between an end wall surface of the bore 84 and a right end surface in the drawing of the spool 96. The drain port 92 communicates with the tank 74, while the drain port 94 communicates with the passage 68 of the input shaft 22 through a hydraulic fluid filter 106. The drain port 94 is further communicable with the passage 68 through a relief valve 108 which is arranged parallel with the filter 106. A spring 110 is provided to urge the spool 96 in a direction opposite to a direction in which the spool 96 is urged by the line pressure acting on the right end surface thereof from the inlet port 88.

When the line pressure is increased above a predetermined value, the spool 96 is moved by the line pressure acting on the right end surface thereof in opposition to the force of the spring 110 into a position in which the annular groove 98 provides communication between both the drain ports 92 and 94 and both the inlet and outlet ports 86 and 90 to cause exhaust of an excessive amount of hydraulic fluid fed by the pump 78 and therefore decrease in the line pressure to thereby maintain the line pressure at a predetermined or constant value.

A hydraulic fluid for lubrication is fed into the clutches 52 and 54 through the passage 68 from the drain port 94 opened by the spool 96 prior to the drain port 92 when the spool 96 is moved leftwards in the drawing by the line pressure acting on the right end surface. When the filter 106 clogs up, the relief valve 108 is opened to provide communication between the drain port 94 and the passage 68 to thereby prevent a hydraulic fluid circuit anterior to the filter 106, the torque converter 14 and the clutches 52 and 54 from being damaged.

The line pressure thus regulated is fed to the clutches 52 and 54 for engagement thereof through an inching valve or a shut-off valve 112 according to the invention and a selector valve 114.

The shut-off valve 112 comprises a housing 116 formed with a bore 118, an inlet port 120, an outlet port 122 and a drain port 124. The inlet port 120 communicates with the pump 78 and with the inlet ports 86 and 88 of the pressure regulating valve 80. The outlet port 122 communicates with an inlet port of the selector valve 114. The drain port 124 communicates with the tank 74. A valve spool 126 is slidably fitted in the bore 118. The spool 126 is operatively connected to a brake pedal 128 of the vehicle. When the brake pedal 128 is not depressed, the spool 126 is moved into a position shown in FIG. 1 in which it provides communication between the inlet and outlet ports 120 and 122 and obstructs communication between the outlet and drain ports 122 and 124. When the brake pedal 128 is depressed, the spool 126 is moved into a position in which it closes the inlet port 120 and provides communication between the outlet and drain ports 122 and 124. The structure of the spool 126 will be described hereinafter.

The selector valve 114 comprises a housing 130 formed with a bore 132, an inlet port 134, outlet ports 136, 138, 140 and 142 and drain ports 144 and 146. The inlet port 134 communicates with the outlet port 122 of the shut-off valve 112. The outlet ports 136 and 138 communicate respectively with the fluid chambers 58 and 62 of the clutches 52 and 54 through the passages 64 and 66. The outlet ports 140 and 142 both communicate with a pressure modulating valve 148. The drain ports 144 and 146 both communicate with the tank 74. A valve spool 150 is slidably fitted in the bore 132 and is operatively connected to a change-over lever 152 which is manually operated by a driver (not shown) of the vehicle. The lever 152 has neutral, forward and reverse positions N, F and R in this embodiment. When the lever 152 is moved into the neutral position N, the spool 150 is moved into a position in which it closes the inlet port 134 and provides communication between the outlet and drain ports 136 and 144 and between the outlet and drain ports 138 and 146. When the lever 152 is moved into the forward travel position F, the spool 150 is moved into a position shown in FIG. 1 in which it provides communication between the inlet port 134 and both the outlet ports 136 and 140 and between the outlet and drain ports 138 and 146 and blocks communication between the drain port 144 and both the outlet ports 136 and 140. When the lever 152 is moved into the reverse travel position R, the spool 150 is moved into a position in which it provides communication between the inlet port 134 and both the outlet ports 138 and 142 and between the outlet and drain ports 136 and 144 and obstructs communication between the drain port 146 and both the outlet ports 138 and 142.

The pressure modulating valve 148 comprises a housing 154 formed with bores 156 and 158, inlet ports 160 and 162 and drain ports 164 and 166. The inlet ports 160 and 162 both communicate with both the outlet ports 140 and 142 of the selector valve 114. The drain ports 164 and 166 both communicate with the tank 74. The cross sectional area of the bore 156 is larger than that of the bore 158. Pistons 168 and 170 are slidably fitted respectively in the bores 156 and 158. A spring 172 is provided to urge the pistons 168 and 170 away from each other. A piston 174 is slidably fitted in a bore located between an inner end wall surface of the housing 154 and an end surface of the piston 168. A spring 176 is provided to urge the piston 174 toward the piston 168. A fluid chamber 178 is defined between the pistons 168 and 174 and communicates with the inlet port 160 through an orifice 180 which is formed through the piston 174. The fluid chamber 178 is communicable with the drain port 164. A fluid chamber 182 is defined between an end wall surface of the bore 158 and an end surface of the piston 170. The inlet port 162 communicates with the fluid chamber 182 and is communicable with the drain port 166 through the fluid chamber 182.

The output port 90 of the pressure regulating valve 80 communicates through a restriction 184 and a passage 186 with an inlet port of the torque converter 14 for supply of the line pressure and is communicable with the tank 74 through a relief valve 188. An outlet port of the torque converter 14 communicates with a pressure retaining valve 190 which communicates with the filter 106. The pressure retaining valve 190 serves to maintain the pressure of hydraulic fluid in the torque converter 14 at a predetermined value or a positive value. When a passage interconnecting the torque converter 14 and the filter 106 clogs up so that the pressure of hydraulic fluid in the torque converter 14 is increased to an excessively high value, the relief valve 188 is opened to provide communication between the torque converter 14 and the tank 74 to thereby prevent the torque converter 14 from being damaged.

The transmission 10 and the hydraulic control system 12 thus described are operated in the following manner.

When the selector lever 152 is moved by the driver into the forward position F shown in the drawing, since the selector valve 114 provides communication between the inlet and outlet ports 134 and 136 so that the line pressure is fed into the fluid chamber 58 through the passage 64, the piston 56 is moved leftwards in the drawing to engage the forward clutch 52. As a result, since the gear wheel 36 is rotated through the clutch 52 by the clutch input shaft 22 rotated by the torque converter output shaft 20 and power of the engine is transmitted to a driving wheel (not shown) of the vehicle by way of a gear train (not shown) including the gear wheel 36, the vehicle travels in the forward position. In this instance, since the selector valve 114 also provides communication between the outlet and drain ports 138 and 146 and therefore between the fluid chamber 62 and the tank 74 so that the line pressure in the fluid chamber 62 is drained, the reverse clutch 54 is released.

When the selector lever 152 is moved by the driver into the reverse position R, since the selector valve 114 provides communication between the inlet and outlet ports 134 and 138 so that the line pressure is fed into the fluid chamber 62 through the passage 66, the piston 60 is moved rightwards in the drawing to engage the reverse clutch 54. As a result, since the gear wheel 40 is rotated through the clutch 54 by the clutch input shaft 22 and the engine power is transmitted to the driving wheel of the vehicle through a gear train (not shown) including the gear wheel 40, the vehicle travels in the reverse direction. In this instance, since the selector valve 114 also provides communication between the outlet and drain ports 136 and 144 and therefore between the fluid chamber 58 and the tank 74, the line pressure in the fluid chamber 58 is drained to release the forward clutch 52.

When the vehicle is in the forward or reverse travel condition, the selector valve 114 provides communication between the inlet port 134 and the outlet port 140 or 142 so that the line pressure acts on both the pistons 168 and 170. Due to the difference between the pressure receiving areas of the pistons 168 and 170, the piston 170 is moved by the piston 168 through the force of the spring 172 into its rightmost position shown in the drawing so that it obstructs communication between the drain port 166 and the inlet port 162. Accordingly, the line pressure fed from the outlet port 136 or 138 of the selector valve 114 into the clutch 52 or 54 is maintained at a value regulated by the pressure regulating valve 80 so that engagement of the clutch 52 or 54 is surely kept. Also, after the control or working hydraulic fluid fed from the outlet port 90 of the pressure regulating valve 80 to the torque converter 14 is passed through the same, it is fed to the passage 68 through the pressure retaining valve 190 and the filter 106 and is then fed between the drive plates 44 or 46 and the driven plates 48 or 50 of the clutch 52 or 54 for lubrication.

When the selector lever 152 is in the neutral position N, since the spool 150 of the selector valve 114 closes the inlet port 134 and concurrently provides communication between the outlet and drain ports 136 and 144 and between the outlet and drain ports 138 and 146, the clutches 52 and 54 both are released so that the rotation of the clutch input shaft 22 is not transmitted to either of the gear wheels 36 and 40. Accordingly, the vehicle is at rest. However, in this state, since the hydraulic fluid is fed from the drain port 94 of the pressure regulating valve 80 to the passage 68, the clutches 52 and 54 both can be lubricated.

At this time, the modulator valve 148 is put by the force of the spring 172 into a rest position shown in the drawing in which the pistons 168 and 170 are farthest away from each other, since the line pressure is not fed to the outlet ports 140 and 142 of the selector valve 114. At this state, when the driver moves the selector lever 152 into the forward or reverse position F or R for starting to move the vehicle, the line pressure begins to be fed into the fluid chamber 58 or 62 through the outlet port 136 or 138 and the passage 68. Concurrently, the line pressure is fed to the inlet ports 160 and 162 of the modulator valve 148 from the outlet port 140 or 142 of the selector valve 114. The line pressure fed into the inlet port 162 acts on the piston 170 without a time delay but the line pressure fed into the inlet port 160 acts on the piston 168 with a time delay because of the presence of the orifice 180 formed through the piston 174. As a result, at first the piston 170 only is moved by the line pressure leftwards in the drawing to provide communication between the inlet port 162 and the drain port 166. Thus, the line pressure fed from the outlet port 136 or 138 to the clutch 52 or 54 is reduced at the initial stage of the changeover of the selector lever 152 from the neutral position to the forward or reverse position to alleviate a shock occurring due to engagement of the clutch 52 or 54. Subsequently, when the line pressure fed to the inlet port 160 prevails in the fluid chamber 178 through the orifice 180 with a time delay, the piston 168 gradually moves the piston 170 rightwards in the drawing through the spring 172 because it has a pressure receiving area larger than that of the piston 170. As a result, since the drain port 166 is gradually closed by the piston 170 to gradually increase the line pressure, fed from the outlet port 136 or 138 to the clutch 52 or 54, in accordance with the speed at which the drain port 166 is closed. Accordingly, since the engaging force of the clutch 52 or 54 is gradually increased, the vehicle can start smoothly.

When the selector valve 114 is moved into the neutral position, the outlet ports 140 and 142 are separated from the inlet port 134 so that no line pressure is fed to the modulator valve 148. At this time, the piston 174 is moved into a position by the piston 168, which is moved leftwards by the force of the spring 172 in which position the piston 174 opens the drain port 164 to exhaust the hydraulic fluid in the fluid chamber 178, and because of this the return of the piston 168 into its leftmost position shown in the drawing is effected without a time delay to render it possible for the modulator valve 148 to modulate the line pressure again.

When the brake pedal 128 is depressed, the spool 126 of the shut-off valve 112 is moved and varies the degree of communication between the inlet port 120 and the outlet port 122 and concurrently the degree of communication between the outlet and drain ports 122 and 124 in accordance with the degree of depression of the brake pedal 128. As a result, the line pressure fed to the clutches 52 and 54 through the selector valve 114 is reduced to obtain an incompletely engaged condition of the clutch 52 or 54. In this instance, because the degree of opening of the inlet port 120 is reduced, the line pressure in the hydraulic fluid circuit upstream of the shut-off valve 112 is increased to move the spool 96 of the pressure regulating valve 80 into a position in which the inlet port 86 communicates with the drain port 94. As a result, a large quantity of hydraulic fluid is fed into the clutches 52 and 54 through the filter 106 and the passage 68 and performs a necessary lubrication of the clutches 52 and 54 which are in the incompletely engaged condition in which it is most necessary to lubricate the clutches 52 and 54.

When the brake pedal 128 is depressed to cause the spool 126 of the shut-off valve 112 to fully close the inlet port 120 to stop the feed of the line pressure to either the clutch 52 or 54 to release it and is then gradually returned into its released position, the clutch 52 or 54 is again engaged by way of the incompletely engaged condition.

When the shut-off valve 112 is operated by the brake pedal 128, the value of the line pressure fed to either the clutch 52 or 54 is determined by the position of the shut-off valve 112 and at this time the modulator valve 148 is not operated. This is because, when the operating time or the movement of the shut-off valve 112 is longer or later than the time delay of operation of the piston 168 due to the orifice 180, a hydraulic fluid pressure having the same value acts on each of the pistons 168 and 170 so that the drain port 166 is closed by the piston 170 moved by the difference between the pressure receiving areas of the pistons 168 and 170.

Figure 2:
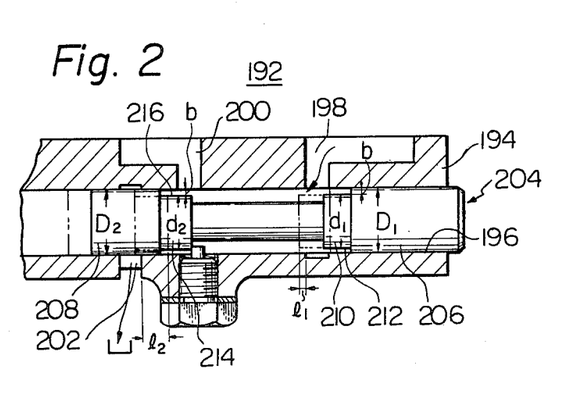
FIG. 2 is a schematic cross sectional view of a part of a conventional inching valve.

Referring to FIG. 2 of the drawings, there is shown a part of a conventional shut-off valve or inching valve. In FIG. 2, the illustration of the same parts as those of the shut-off valve 112 shown in FIG. 1 are omitted for brevity. The conventional shut-off valve 192 includes a housing 194 which is partially shown in FIG. 2 and is formed with a bore 196 and inlet, outlet and drain ports 198, 200 and 202 corresponding to the bore 118 and the inlet, outlet and drain ports 120, 122 and 124 of the shut-off valve 112 of FIG. 1. The spool 204 of the conventional shut-off valve 192 has first and second lands 206 and 208 both in sliding engagement with an internal wall surface of the bore 196. The first land 206 is stepped to provide a shoulder which is connected to a first reduced stem portion 210 having a uniform diameter smaller than that of the land 206. An annular groove or choke 212 is defined between the reduced stem portion 210 and the internal wall surface of the bore 196. The reduced stem portion 210 limits the cross sectional area of the inlet port 198 and the land 206 closes it in accordance with the depression of the brake pedal 128. The second land 208 is stepped to provide a shoulder which is connected to a second reduced stem portion 214 having a uniform diameter smaller than that of the land 208. An annular groove or choke 216 is defined between the reduced stem portion 214 and the internal wall surface of the bore 196. After the land 208 opens the drain port 202, the reduced stem portion 214 limits the cross sectional area of the drain port 202 in accordance with the depression of the brake pedal 128.

The conventional shut-off valve 192 thus described possesses the inconvenience that it is difficult to obtain an incompletely engaged or a slipping condition of the clutches 52 and 54 and therefore an inching operation of the vehicle when the brake pedal 128 is depressed owing to the structure of the spool 204 which causes the hydraulic fluid pressure fed to the clutch 52 or 54 to abruptly vary in the following manner.

Figure 3:
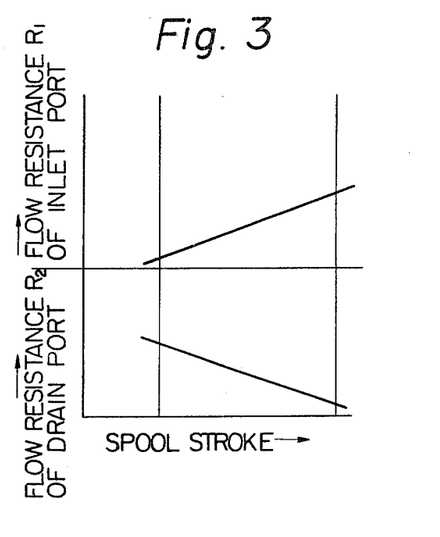
FIG. 3 is a graphic representation of the relationships between the displacement of the spool of the inching valve shown in FIG. 2 and the flow resistances of inlet and drain ports.
Figure 4:
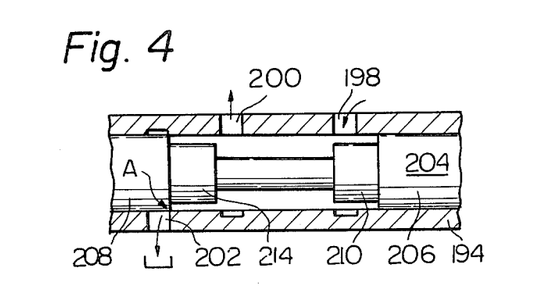
FIGS. 4 and 5 are schematic cross sectional views of the spool of the inching valve shown in FIG. 2 which is in two different positions, respectively.
Figure 5:
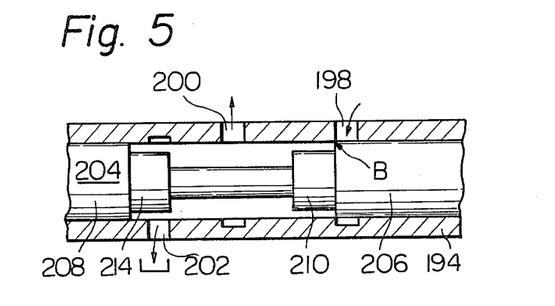
Figure 6:
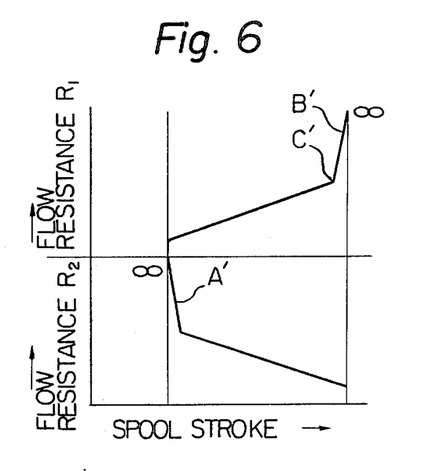
FIG. 6 is a graphic representation of the relationships between the displacement of the spool of the inching valve of FIG. 2 and the actual flow resistances of the inlet and drain ports.

When the brake pedal 128 is depressed, the distance $l_1$, shown in FIG. 2, between an end of the reduced stem portion 210 and the leftmost edge in the drawing of the inlet port 198, and the distance $l_2$, shown in FIG. 2, between an end of the reduced stem portion 214 and the rightmost edge in the drawing of the drain port 202 are varied in accordance with stroke or axial movement of the spool 204, and the flow resistances $R_1$ and $R_2$ of the inlet and drain ports 198 and 202 produced respectively by the first and second reduced stem portions 210 and 214 are varied in accordance with the distances $l_1$ and $l_2$ as shown in FIG. 3 of the drawings. The shut-off valve 192 has been designed in such a manner that the total $(R_1+R_2)$ of the flow resistances $R_1$ and $R_2$ is made constant. However, in fact, before and immediately after the second land 208 opens the drain port 202, as shown in FIG. 4 of the drawings, an abrupt change in the flow resistance $R_2$ occurs at a portion shown by A in FIG. 4, as shown by the line A' in FIG. 6 of the drawings. Also, after and immediately before the first land 206 closes the inlet port 198 as shown in FIG. 5 of the drawings, an abrupt change in the flow resistance $R_1$ occurs at a portion shown by B in FIG. 5, as shown by the line B' in FIG. 6. Accordingly, at these times the total $(R_1+R_2)$ is not made constant and causes an abrupt decrease in the hydraulic fluid pressure fed to the clutch 52 or 54. The flow resistance change shown by A' in FIG. 6 occurs due to the flow resistance $R_2$ being made infinitely great when the second land 208 closes the drain port 202 and the flow resistance $R_2$ being abruptly reduced when the second land 208 opens the drain port 202. Also, the flow resistance change shown by B' in FIG. 6 occurs due to the flow resistance $R_1$ which is at a value shown by C' in FIG. 6 when the first land 206 opens the inlet port 198 being abruptly increased immediately before the first land 206 fully closes the inlet port 198 and the flow resistance R₁ being made infinitely great when the first land 206 fully closes the inlet port 198. As a result, the hydraulic fluid pressure fed to the clutch 52 or 54 is varied as shown by the solid line a in FIG. 7 of the drawings and is abruptly reduced or increased between 1 and 2 of the line a and between 3 and 4 thereof, when the brake pedal 128 is being depressed or released, to make it difficult to obtain an incompletely engaged condition of the clutch 52 or 54 by the operation of the shut-off valve 192.

Figure 7:
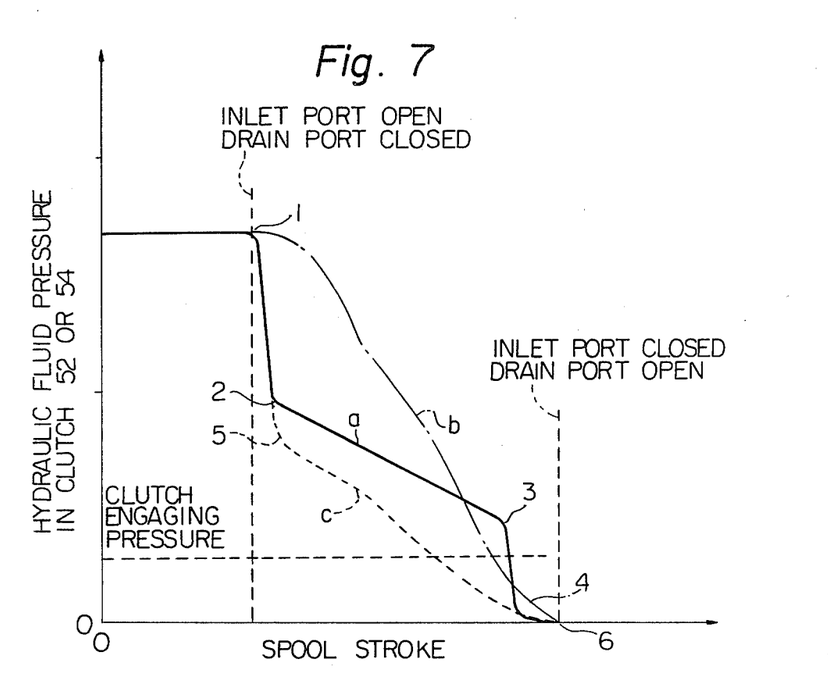
FIG. 7 is a graphic representation for the spools of the inching valve of FIG. 2, an undesirable inching valve, and an improved inching valve according to the invention of the relationship between displacement of the respective spool and a hydraulic fluid pressure fed to a clutch shown in FIG. 1.
Figure 8:
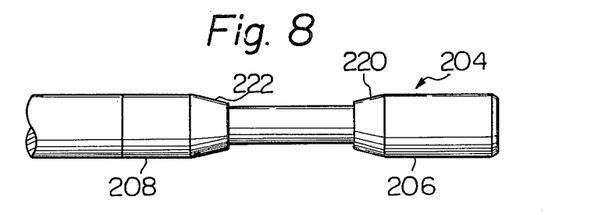
FIG. 8 is a schematic view of the spool of the undesirable inching valve mentioned above.

In order to moderate change in the flow resistance when the drain and inlet ports 202 and 198 are opened and closed respectively by the lands 208 and 206, it is considered to provide the spool 204 (FIG. 8) with a first tapered portion 220, in place of the first reduced stem portion 210, which is tapered from an end of the first land 206 to an end of the portion 220 so as not to form a shoulder and a second tapered portion 222, in place of the second reduced stem portion 214, which is tapered from an end of the second land 208 to an end of the portion 222 so as not to form a shoulder, as shown in FIG. 8 of the drawings. The degrees of the tapers of the portions 220 and 222 are about equal to each other. When the spool 204 thus constructed is employed, because the inclination of the hydraulic fluid pressure, fed to the clutch 52 or 54, with respect to the axial movement of the spool 204 is steep as shown by the phantom line b in FIG. 7, the change in the line pressure with respect to the axial movement of the spool 204 is great. As a result, because it is necessary to minutely move the brake pedal 128, it is still difficult to obtain an incompletely engaged condition of the clutch 52 or 54 by the inching valve 192.

Figure 9:
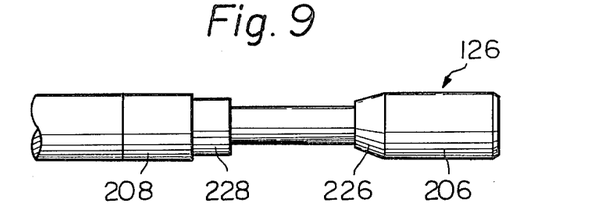
FIG. 9 is a schematic view of the spool of the improved inching valve according to the invention.

Referring to FIG. 9 of the drawings, there is shown a preferred embodiment of the spool 126 of the inching valve 112 according to the invention which forms a part of the hydraulic control system 12. In FIG. 9, the same parts as those of the spool 204 shown in FIG. 2 are designated by the same reference numerals as those used in FIG. 2. The spool 126 shown in FIG. 9 is provided with a tapered portion 226 which is tapered off from an end of the first land 206 and has a diameter equal to that of the first land 206 at an end connected thereto, and a reduced stem portion 228 which has a diameter smaller than that of the second land 208 and which is connected at an end thereof to the second land 208.

The inching valve 112 having the spool 126 thus described has characteristics represented by the dotted line C in FIG. 7. The characteristics are as follows: When the second land 208 opens the drain port 124, the hydraulic fluid pressure in the clutch 52 or 54 is abruptly reduced to a first value shown by the reference numeral 5 in FIG. 7. When the hydraulic fluid pressure is at the first value, the clutch 52 or 54 is completely engaged still. When the spool 126 is further axially moved, the tapered portion 226 limits the cross sectional area of the inlet port 120 so that the hydraulic fluid pressure is gently reduced in accordance with the axial movement of the spool 126 toward a second value shown by the reference numeral 6 in FIG. 7. When the first land 206 completely closes the inlet port 120, the hydraulic fluid pressure attains the second value so that the clutch 52 or 54 is released. Thus, since the inclination of the line C between 5 and 6 becomes gentle, the change in the hydraulic fluid pressure in relation to the axial movement of the spool 126 becomes smaller to broaden the range of the axial movement of the spool 126 in which range an incompletely engaged condition of the clutch 52 or 54 is obtained. Accordingly, an operation of the inching valve 112 for obtaining the incompletely engaged condition of the clutch 52 or 54 becomes easy.

On the contrary, in the case of the spool 204 shown in FIG. 2, since the inclination of the portion between 3 and 4 of the curve a representing the characteristics is steep, the range of axial movement of the spool 204 is narrow in which an incompletely engaged condition of the clutch 52 or 54 is obtained.

Also, in the case of the spool 204 shown in FIG. 8, the inclination of the line b representing the characteristics is steep as a whole. As a result, since the range of axial movement of the spool 204 is narrow in which an incompletely engaged condition of the clutch 52 or 54 is obtained, it is difficult or impossible to effect an inching operation of the vehicle.

Although the invention has been described such that the first land 206 has the tapered portion 226 connected thereto and the second land 208 has the reduced stem portion 228 connected thereto to provide a step at an end of the land 208, the first land 206 may have, in place of tapered portion 226, another portion if the such other portion has a form serving to gradually increase the flow resistance of the inlet port 120 in accordance with the axial movement of the spool 126 into its position in which the first land 206 fully closes the inlet port 120. Also, the second land 208 may have, in place of the reduced stem portion 228, a different portion if the different portion has a form serving to temporarily abruptly reduce the flow resistance of the drain port 124 and subsequently gradually reduce the flow resistance of the drain port 124 in accordance with the axial movement of the spool 126 from its position in which the second land 208 opens the drain port 124.

The inching valve according to the invention has the following advantages owing to the construction of the spool mentioned hereinbefore.

(1) Since the change in the pressure of hydraulic fluid fed to the clutch for engagement thereof is gentle in relation to the axial movement of the spool, an incompletely engaged or a slipping condition of the clutch is easily obtained to facilitate the operation and manipulation of the vehicle.

(2) Since abrupt starting of the vehicle, falling of cargo from the vehicle, etc. are prevented even if the vehicle is operated by an unskilled operator, the fatigue of the operator is reduced, the safety in work and operation is increased and the operation and manipulation of the vehicle are easy and comfortable.

What is claimed is:

1. A hydraulic control system in combination with at least one hydraulic power clutch, comprising:
 a source feeding a hydraulic fluid pressure,
 a pressure regulating valve for regulating said hydraulic fluid pressure to a control pressure, the clutch being communicable with said pressure regulating valve for receiving said control pressure for engagement of the clutch, and
 an inching valve disposed between said pressure regulating valve and the clutch and comprising:
 a valve body which having
 an inlet port communicating with said pressure regulating valve for admitting hydraulic fluid into said valve body,
 an outlet port communicating with the clutch for the outflow of hydraulic fluid from said valve body, and a drain port communicating with a drain for draining hydraulic fluid from said valve body, said drain port being communicable within said valve body with said inlet port, and a spool axially movably located in said valve body and having a first land for opening and closing said inlet port in response to axial movement of said spool, said first land having a first portion for gradually and continuously increasing the flow resistance of said inlet port at a first rate in response to axial movement of said spool in a first direction until said first land fully closes said inlet port and for gradually and continuously reducing the flow resistance of said inlet port at said first rate in response to axial movement of said spool in a second direction opposite to said first direction until said first land fully opens said inlet port, and a second land for opening and closing said drain port for providing and obstructing communication between said inlet and drain ports in response to axial movement of said spool, said second land having a second portion for abruptly reducing the flow resistance of said drain port at a second rate higher than said first rate immediately after said second land first opens said drain port in response to axial movement of said spool in said first direction, and for abruptly increasing the flow resistance of said drain port at said second rate immediately before said second land fully closes said drain port in response to axial movement of said spool in said second direction, and for subsequently gradually reducing the flow resistance of said drain port at a third rate lower than said second rate in response to axial movement of said spool.

2. A hydraulic control system as claimed in claim 1, wherein said first portion is tapered from one end thereof to the other end and is connected at said one end to said first land and has at said one end a diameter equal to that of said first land, and wherein said second portion is formed of a reduced stem portion having throughout the length thereof a uniform diameter smaller than that of said second land and connected at an end thereof to said second land.

3. A hydraulic control system as claimed in claim 1, wherein said first portion comprises a diameter which progressively decreases from one end thereof to the other end and is connected at said one end to said first land and has at said one end a diameter equal to that of said first land, and wherein said second portion comprises a reduced stem portion having throughout the length thereof a uniform diameter smaller than that of said second land and being connected at an end thereof to said second land.

4. In a hydraulic control system for a hydraulic power clutch of an automotive vehicle equipped with a brake pedal, including a source of pressurized hydraulic fluid;

a pressure regulating valve for requlating the pressure of said pressurized hydraulic fluid to a control pressure; and an inching valve fluidly interposed between said regulating valve and the clutch, said inching valve including:

a valve body having a bore, an inlet port for hydraulic fluid communicating with said regulating valve and said bore, an outlet port for hydraulic fluid communicating with said clutch and said bore, a drain port for hydraulic fluid communicating with said bore and a reservoir of said hydraulic fluid source, a spool reciprocatingly received in said bore, said spool being operatively connected with said brake pedal so as to reciprocate in response to depression of said brake pedal, said spool having a first land for controlling the effective cross-sectional area of said inlet port, and a second land for controlling the effective cross-section of said drain port, said spool having a normal position in which said first land opens said inlet port to provide communication between said inlet port and said outlet port and in which said second land closes said drain port, a first position in which said second land opens said drain port so that both said inlet and drain ports communicate with said outlet port, and a second position in which said first land fully closes said inlet port and said second land permits communication between said drain port and said outlet port, said spool being movable from said normal position toward said second position via said first position in response to depression of said brake pedal;

the improvement comprising:

said first land comprising a first portion which continuously increases the flow resistance of said inlet port in response to movement of said spool completely into said second position, and said second land comprising a second portion which first stepwisely abruptly reduces the flow resistance of said drain port in response to movement of said spool away from said neutral position and thereafter relatively slowly further reduces the flow resistance of said drain port in accordance with the movement of said spool away from said first position.

5. A hydraulic control system as claimed in claim 4, wherein said first portion comprises a tapered portion connected at one end thereof to said first land and having at said one end the same diameter as that of said first land and tapered from said one end to the other end, and wherein said second portion comprises a reduced stem portion connected at an end thereof to said second land and having a uniform diameter smaller than that of said second land.

6. A hydraulic control system as claimed in claim 4, wherein said first portion comprises a diameter which progressively decreases from one end thereof to the other end and is connected at said one end to said first land and has at said one end a diameter equal to that of said first land, and wherein said second portion comprises a reduced stem portion having throughout the length thereof a uniform diameter smaller than that of said second land and being connected at an end thereof to said second land.

7. A hydraulic clutch control system, comprising:

a valve body having a bore;

an inlet port for admitting hydraulic fluid into said valve body;

an outlet port for outflow of hydraulic fluid from said valve body;

a drain port for draining hydraulic fluid from said valve body;

a spool reciprocatively disposed in said bore and having a first land which continuously varies the effective cross-sectional area of said inlet port between zero and a first predetermined value and a second land which stepwisely varies the effective cross-sectional area of said drain port between zero and a second predetermined value and continuously varies the length of a throttling path defined by said second land between said drain port and said outlet port, so that the pressure prevailing at said outlet port can be rapidly decreased from a maximum value to a third predetermined value and thereafter smoothly decreased to zero and smoothly increased from zero to substantially said third predetermined level and thereafter rapidly increased to said maximum value.

8. A hydraulic control system for a hydraulic clutch of an automotive vehicle having a brake pedal, comprising:

a source of hydraulic fluid under pressure;

a pressure regulating valve for controlling the pressure of the hydraulic fluid fed from said source to a control pressure;

an inching valve fluidly connected with said regulating valve for receiving said control pressure therefrom, said inching valve comprising:

a valve body having a bore;

an inlet port through which hydraulic fluid from said regulating valve enters said bore;

an outlet port through which hydraulic fluid is fed to said hydraulic clutch;

a drain port through which hydraulic fluid drains to a reservoir of said hydraulic fluid source;

a spool reciprocatively disposed in said bore, said spool having a first land formed with a frustro-conical portion for controlling said inlet port, and a second land formed with a reduced diameter cylindrical portion which extends toward said first land, said first and second lands defining a hydraulic chamber within said bore, with which said outlet port is in constant communication, the spacing of said first and second lands being such that the pressure fed from said outlet port to said hydraulic clutch can be rapidly reduced to a level where slippage of said clutch begins via abruptly opening said drain port by moving said spool to a position where the step defined between said reduced diameter portion and the main body of said second land passes over said drain port so that resistance to drainage is provided only by the throttling effect of the hydraulic fluid flowing between said reduced diameter portion and said bore, and thereafter smoothly reducing the pressure fed to said hydraulic clutch to zero by continuously reducing the communication between said inlet port and said bore via moving said frustro-conical land portion to close same while simultaneously reducing said throttling effect, and subsequently smoothly increasing the pressure fed to said hydraulic clutch by moving said frustro-conical land so as to increase the amount of hydraulic fluid permitted to pass through said inlet port while simultaneously increasing said throttling effect, and subsequently rapidly increasing the pressure at which the clutch begins to transmit torque to a maximum pressure by passing said step over said drain port to close same.

* * * * *